United States Patent [19]

Oshima

[11] Patent Number: 5,852,671
[45] Date of Patent: Dec. 22, 1998

[54] METHOD FOR RECONSTRUCTING A CURVED SURFACE OF A SUBJECT AND AN APPARATUS FOR RECONSTRUCTING A CURVED SURFACE OF A SUBJECT

[75] Inventor: Mitsuo Oshima, Tokyo, Japan

[73] Assignee: Oki Electric Industry Co., Ltd., Tokyo, Japan

[21] Appl. No.: 829,818

[22] Filed: Mar. 25, 1997

[30] Foreign Application Priority Data

Aug. 29, 1996 [JP] Japan ..................... 8-228196

[51] Int. Cl.$^6$ ....................... G06K 9/00
[52] U.S. Cl. ............ 382/154; 356/376; 345/429
[58] Field of Search ................. 382/154, 153, 382/100, 108, 276, 285, 203, 274; 356/12–14, 376; 345/419, 425, 429, 139; 348/42, 47–48, 51

[56] References Cited

U.S. PATENT DOCUMENTS

| | | | |
|---|---|---|---|
| 4,908,573 | 3/1990 | Kaufman et al. | 324/309 |
| 5,175,773 | 12/1992 | Garreau et al. | 382/130 |
| 5,652,805 | 7/1997 | Ooenoki et al. | 382/141 |
| 5,724,456 | 3/1998 | Boyack et al. | 382/274 |
| 5,761,332 | 6/1998 | Wischmann et al. | 382/154 |

OTHER PUBLICATIONS

"Reconstruction of 3D Orientation of Skin Surface Replicas by Expanding Photometric Stereo", The Transactions of the Institute of Electronics, Information, and Communication Engineers of Japan, Part D–II, vol. J77–D–II, No. 9 pp. 1797–1805, Sep. 1994.

"Recovery of Curved Surfaces from Stereo of Isoluminance Contours", The Transactions of the Institute of Electronics, Information, and Communication Engineers of Japan, Part D–II, vol. J77–DII, No. 9, pp. 1673–1679, Sep. 1994.

"Photometric Stereo by Simultaneous Illumination with Three Colored Lights", The Transactions of the Institute of Electronics, Information, and Communication Engineers of Japan, Part D–II, vol. J 76–D–II, No. 10, pp. 2243–2246, Oct. 1993.

"Binocular Shading and Visual Surface Reconstruction", Computer Vision, Graphics, and Image Processing 28, pp. 19–43 (1984).

"Shape from Interreflections", IEEE 1990, pp. 2–11.

"Reconstruction of Curved Surface Using Isodensity Maps Based on Stereo Vision System", SPIE, vol. 2249, Automated 3D and 2D Vision (1994), pp. 243–253.

Primary Examiner—Leo H. Boudreau
Assistant Examiner—Bhavesh Mehta
Attorney, Agent, or Firm—Rabin & Champagne P.C.

[57] ABSTRACT

A method and an apparatus for accurately detecting and reconstructing the shape of a curved surface of a subject. The apparatus is provided with an image detecting part for photographing a subject from two different positions and detecting gradational images seen from the respective positions, and a curved surface reconstructing part for computing a luminance ratio of pixels corresponding to each other in the different gradational images, computing an inclination of a surface of the subject on the basis of this luminance ratio, and reconstructing a curved surface of the subject. The method obtains an inclination of the surface of the first observed part by obtaining inclinations of the surfaces of the second and the third observed part which are adjacent to the first observed part and taking an average of these first and second inclinations.

11 Claims, 13 Drawing Sheets

Left gradational image

Right gradational image

Left and right images corresponding information

Fig.7(A)                Fig.7(C)
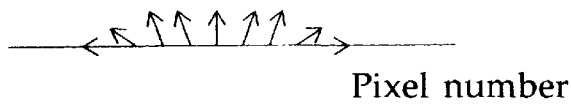
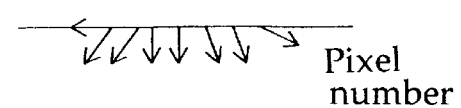
FIG.7(B)                Fig.7(D)
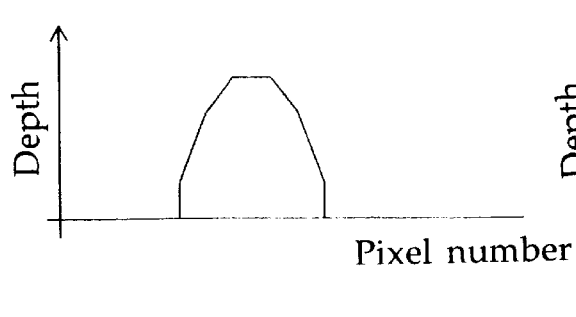
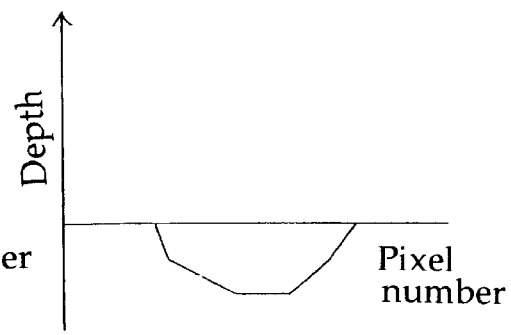
FIG.7(E)
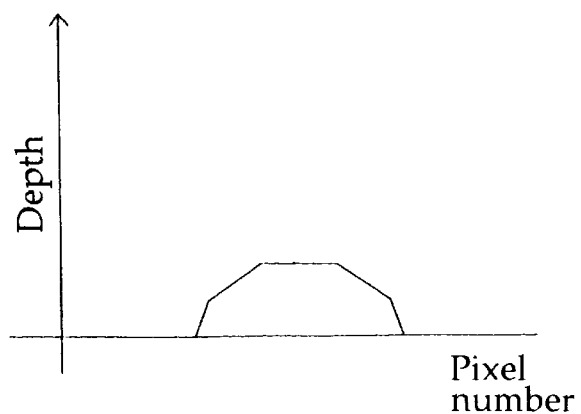

METHOD FOR RECONSTRUCTING A CURVED SURFACE OF A SUBJECT AND AN APPARATUS FOR RECONSTRUCTING A CURVED SURFACE OF A SUBJECT

BACKGROUND OF THE INVENTION

1. Field of the Invention

The present invention relates to a method for computing an inclination of the surface of each part of a subject from a stereoscopic image of the subject and reconstructing a curved surface of the subject on the basis of the inclinations, and an apparatus suitable for implementing this method.

2. Description of the Related Art

Up to now, as a method for detecting an inclination of the surface of each part of a subject, there has been a "illuminance difference stereoscopic method" disclosed, for example, in literature I "THE TRANSACTIONS OF THE INSTITUTE OF ELECTRONICS, INFORMATION, AND COMMUNICATION ENGINEERS OF JAPAN, PART D-II vol. J77-D-II No. 9 pp. 1797–1805, September 1994". This illuminance difference stereoscopic method is a technique for reconstructing a three-dimensional shape by computing an inclination of a surface of an object from variation of its luminance and can obtain the direction of a surface element of each point of the object from plural images obtained by photographing the object from a fixed position as changing only the direction of a light source in the same scene. And the three-dimensional shape of the object can be reconstructed by integrating inclinations of the surface elements.

And there is a method which photographs a subject from at least two different positions, detects gradational images, namely, stereoscopic images seen from the respective positions, detects a position of an observed part on the subject by detecting pixels in the respective gradational images which pixels correspond to the observed part, and reconstructs the three dimensional shape of the subject (literature II "THE TRANSACTIONS OF THE INSTITUTE OF ELECTRONICS, INFORMATION, AND COMMUNICATION ENGINEERS OF JAPAN, PART D-II vol. J77-D-II No. 0.9 pp. 1673–1679, September 1994").

However, in the illuminance difference method which is an existing prior inclination detecting method, it is necessary to limit a light source and a material for an object and then prepare a reflectivity map and furthermore illuminate the object as changing an illuminating direction several times (for example literature I). These problems cause limitation of objects to be detected or complication of a detecting apparatus.

Therefore, up to now, it has been desired that a method and an apparatus are implemented which can work in various environments without being limited by color or brightness of a subject and can detect a surface inclination of the subject without being influenced by arrangement of a light source.

An object of the invention is to provide a method and an apparatus which can solve the above-mentioned problems and furthermore can improve accuracy of measurement and can detect so fine rugged parts of the subject that cannot have been detected up to now.

SUMMARY OF THE INVENTION

According to a first aspect of the present invention, there is provided a method for reconstructing a curved surface of a subject which photographs a subject from at least two different positions and detects each gradational image seen from each of the respective positions, and computes a luminance ratio of pixels corresponding to each other in the different gradational images, and then reconstructs a curved surface of the subject through computing an inclination of the curved surface of the subject on the basis of the luminance ratio. The method comprises the steps of:

obtaining an inclination of the surface of a first observed part of the subject by obtaining inclinations of the surfaces of a second and a third observed part which are adjacent to the first observed part and are different from each other, respectively, as a first and a second inclination, and then taking an average of the first and the second inclination.

According to the method, instead of obtaining an inclination of an observed part as observing the single part of a subject, inclinations of the surfaces of other parts adjacent to the observed part are obtained, respectively, and then an average of these inclinations is taken to obtain the inclination of the surface of the observed part. Therefore, since continuity of the shape of a curved surface of a subject is taken into the curved surface reconstructed on the basis of the inclinations obtained by this method, a more accurate curved surface can be reconstructed. And according to the method, since a surface inclination of a subject can be detected without using the absolute value of luminance, it is possible to detect a surface inclination of the subject in various environments without being limited by color or brightness of the subject and without being influenced by arrangement of a light source.

According to a second aspect of the invention, there is provided a method for reconstructing a curved surface of a subject, comprising the steps of:

(a) photographing a subject from at least two different positions and detecting each gradational image seen from each of the respective positions, (b) computing a luminance ratio of pixels corresponding to each other in said different gradational images, and (c) reconstructing a curved surface of the subject through computing an inclination of the surface of the subject on the basis of the luminance ratio, wherein (b) the step (b) comprises the substeps of:

(b-1) setting one of the gradational images as a reference image, setting as the first pixel one pixel corresponding to an observed part of the subject out of a number of pixels arranged in a matrix forming this reference image, and detecting the first luminance of the first pixel, (b-2) setting as the origin pixel one pixel corresponding to the observed part out of a number of pixels arranged in a matrix forming the one gradational image different from the reference image, setting the second pixel a pixel distant by the first offset from this origin pixel, and detecting the second luminance of the second pixel, (b-3) setting as the third pixel a pixel which is on the straight line drawn through the origin and the second pixel and is at the opposite side to the second pixel in relation to the origin pixel and is distant by the second offset from the origin pixel, and detecting the third luminance of the third pixel, (b-4) obtaining the first luminance ratio of the first luminance and the second luminance, and (b-5) obtaining the second luminance ratio of the first luminance to the third luminance, and wherein furthermore the step (c) comprises s substep of (c-1) reconstructing a curved surface of the subject through computing a surface inclination of the subject on the basis of the first and the second luminance ratio.

In this way, by obtaining inclinations of the surfaces of two parts adjacent to an observed part of a subject and then taking an average inclination of them as the inclination of the observed part, it is possible to suppress oversight of a fine raggedness caused by insufficiency of a detection accuracy in detecting a position of the observed part or a luminance value of a pixel corresponding to the observed part in case of obtaining a luminance ratio for the one observed part and computing an inclination of it. Therefore, it is possible to improve the measurement in accuracy. And since this method can detect a surface inclination of a subject without using the absolute value of luminance, it is possible to detect a surface inclination of the subject in various environments and conditions without being limited by color or brightness of the subject and without being influenced by arrangement of a light source.

In this method, it is preferable that the substep (c-1) may comprise the substeps of:

(h1) computing the first inclination from the first luminance ratio, (h2) computing the second inclination from the second luminance ratio, (h3) obtaining the first inclination of an observed part different from the observed part and constructing the first curved surface on the basis of these first inclinations, (h4) obtaining the second inclination of an observed part different from the observed part and constructing the second curved surface on the basis of these second inclinations, and (h5) reconstructing a curved surface of the subject through setting an average curved surface of the first and the second curved surface as the curved surface of the subject.

And in this method, it is preferable the substep (c-1) may comprise the lower substeps of:

(i1) obtaining an average luminance ratio of the first and the second luminance ratio, (i2) computing an average inclination from the average luminance ratio, and (i3) obtaining the average inclination of an observed part different from the observed part and reconstructing a curved surface of the subject through setting an average curved surface obtained on the basis of these average inclinations as the curved surface of the subject.

According to a preferable example of this method, in the substep (b-1), the reference images for all of the gradational images detected in the step (a) may be set one by one, and then the substeps (b-1) to (b-5) are performed sequentially. After this, preliminary curved surfaces of the subject may be obtained, respectively, on the basis of the respective pairs of the first and second luminance ratios obtained in relation to the reference images. Then, a curved surface of the subject may be obtained as a weighted average curved surface of these preliminary curved surfaces.

In this way, in case of setting each of plural gradational images as a reference image, it is possible to reconstruct a curved surface of a subject seen as shifting a viewing position by obtaining the respective preliminary depths and taking a weighted average of these preliminary depths.

According to a third aspect of the invention, there is provided an apparatus for reconstructing a curved surface of a subject which apparatus comprises an image detecting part for detecting plural gradational images by photographing a subject from at least two different positions and a curved surface reconstructing part for computing a luminance ratio of pixels corresponding to each other in the detected gradational images different from each other and reconstructing a curved surface of the subject through computing a surface inclination of the subject on the basis of this luminance ratio. The curved surface reconstructing part comprises;

a first luminance detecting part for setting one of the plural gradational images as a reference image, setting as the first pixel one pixel corresponding to an observed part of the subject out of a number of pixels arranged in a matrix forming the reference image, and detecting the first luminance of the first pixel, an origin pixel setting part for setting as the origin pixel one pixel corresponding to the first pixel out of a number of pixels arranged in a matrix forming the one gradational image different from the reference image, a second luminance detecting part for setting as the second pixel a pixel distant by the first offset from the origin pixel and detecting the second luminance of the second pixel, a third luminance detecting part for setting as the third pixel a pixel which is on the straight line drawn through the origin and the second pixel and is at the opposite side to the second pixel in relation to the origin pixel and is distant by the second offset from the origin pixel, and detecting the third luminance of the third pixel, a first luminance ratio computing part for obtaining the first luminance ratio of the first luminance and the second luminance, a second luminance ratio computing part for obtaining the second luminance ratio of the first luminance and the third luminance, and a depth detecting part for reconstructing a curved surface of the subject on the basis of the first and the second luminance ratio.

In this way, by obtaining inclinations of the surfaces of two parts adjacent to an observed part of a subject and taking an average inclination of them as the inclination of the observed part, it is possible to suppress oversight of a fine raggedness caused by insufficiency of a detection accuracy in detecting a position of an observed part or a luminance value of a pixel corresponding to the observed part in case of obtaining a luminance ratio for the one observed part and computing its inclination. Therefore, it is possible to improve the measurement in accuracy. Since this method can detect a surface inclination of a subject without using the absolute value of luminance, it is possible to detect a surface inclination of the subject in various environments and conditions without being limited by color or brightness of the subject and without being influenced by arrangement of a light source.

In this apparatus, it is preferable that the image detecting part may comprise a twin-lens stereoscopic detector, a gradational image storing part for storing a left and a right gradational image detected by this twin-lens stereoscopic detector, and a phase-different image storing part for storing a left and right images corresponding information containing relation between the respective pixels corresponding to the same part of the subject in the stored left and right gradational images.

In this apparatus, it is preferable that the depth detecting part may comprise a first inclination computing part for computing the first inclination from the first luminance ratio, a second inclination computing part for computing the second inclination from the second luminance ratio, a first depth computing part for computing the first depth on the basis of the first inclination, a second depth computing part for computing the second depth on the basis of the second inclination, and an average depth computing part for obtaining an average of the first and the second depth and reconstructing a curved surface of the subject on the basis of this average depth.

And in this apparatus, it is preferable that the depth detecting part may comprise an average luminance ratio computing part for computing an average luminance ratio of the first and the second luminance ratio, an average inclination computing part for computing an average inclination from the average luminance ratio, and a third depth computing part for computing an average depth on the basis of the average inclination and reconstructing a curved surface of the subject on the basis of this average depth.

And a preferable composition example of this apparatus comprises;

plural stages of the curved surface reconstructing parts for each of which one of the gradational images different from each other is set as a reference image and a depth integrating part for obtaining a depth of the subject by integrating preliminary depths outputted by these curved surface reconstructing parts.

In this way, this apparatus is an apparatus capable of reconstructing a curved surface of a subject as shifting a viewing position by integrating preliminary depths respectively obtained in case of setting each of plural gradational images as a reference image.

In this apparatus, it is preferable that the integration is performed by means of a weighted average process.

BRIEF DESCRIPTION OF THE DRAWINGS

The foregoings and other objects, features and advantages of the present invention will be better understood from the following description taken in connection with the accompanying drawings, in which:

FIG. 3, comprising

FIG. 4, comprising

FIG. 5, comprising

FIG. 7, comprising FIGS. 7(A)–7(E), shows figures for explaining a process of reconstructing inclinations of surfaces of a subject;

FIG. 11, comprising

DESCRIPTION OF THE PREFERRED EMBODIMENTS

Figure 1:
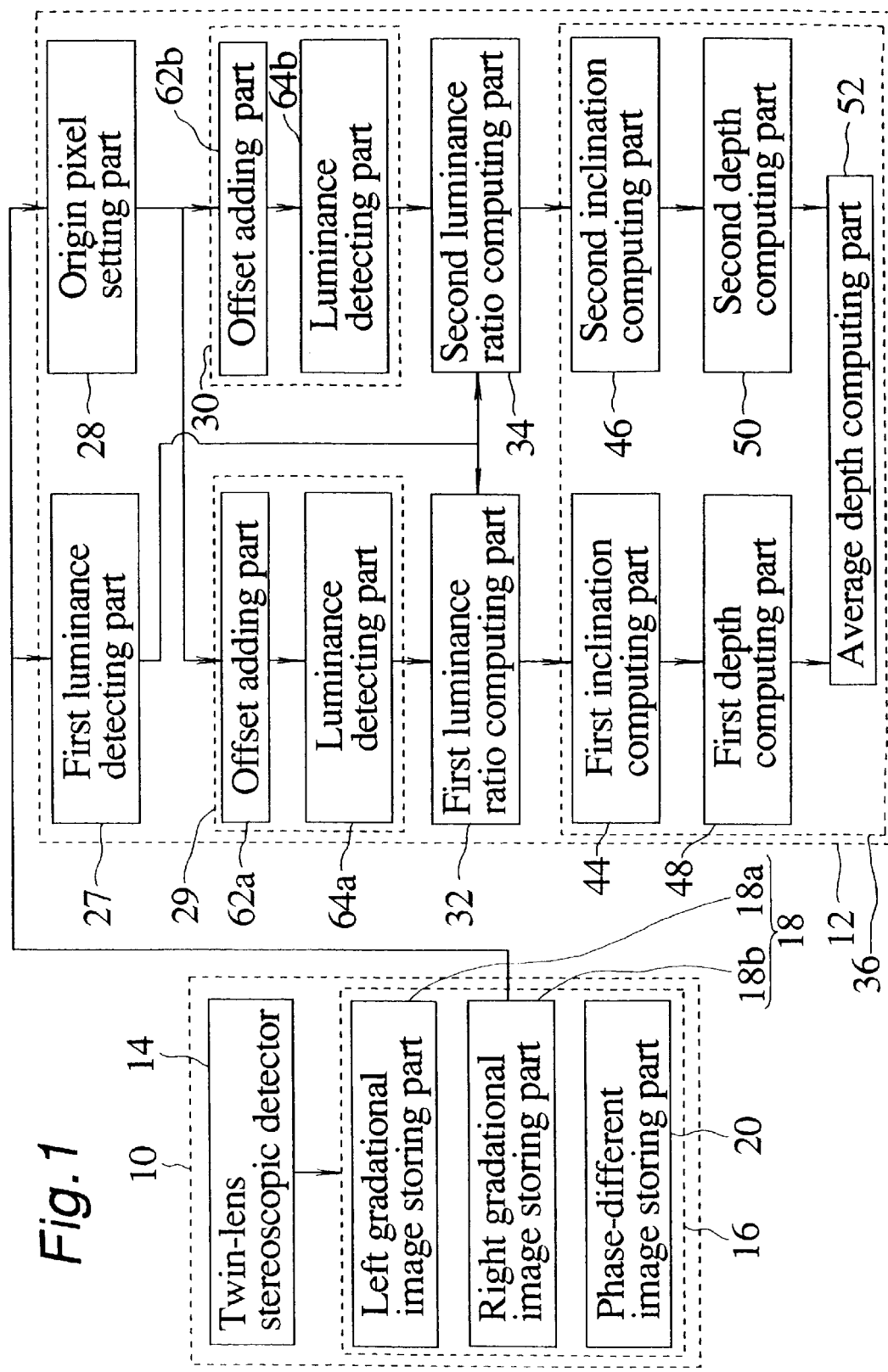
FIG. 1 is a block diagram showing composition of an apparatus for reconstructing a curved surface of a subject according to a first embodiment.

Several embodiments of a method for reconstructing a curved surface of a subject and of an apparatus suitable for such reconstructing according to the present invention are described hereinafter with reference to the drawings. The same numbers have been given to similar components in the drawing figures.

First Embodiment

FIG. 1 is a block diagram showing a first embodiment. An apparatus for reconstructing a curved surface of a subject is provided with an image detecting part 10 for photographing a subject from at least two positions and detecting plural gradational images, and a curved surface reconstructing part 12 for computing a luminance ratio of pixels corresponding to each other in the detected gradational images different from each other and reconstructing a curved surface of the subject by computing an inclination of a surface of the subject on the basis of this luminance ratio.

Figure 2:
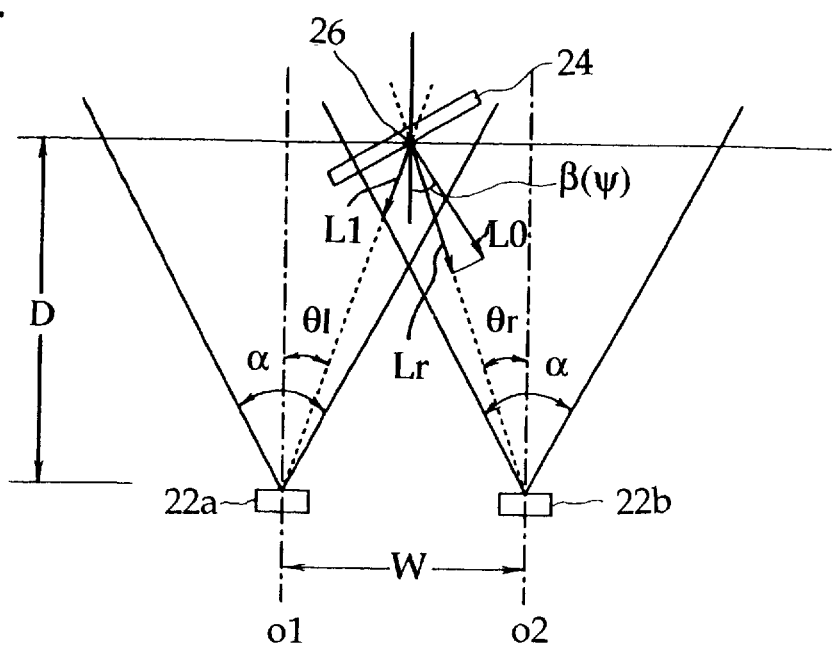
FIG. 2 is a figure showing an example of optical arrangement of cameras and a subject.

The image detecting part 10 is provided mainly with a twin-lens stereoscopic detector 14 and an image storing part 16. The twin-lens stereoscopic detector 14 is provided with two cameras 22a and 22b and a corresponding pixel finding means. FIG. 2 is a diagram showing an example of optical arrangement of the two cameras 22a and 22b and a subject 24. FIG. 2 is also a figure for explaining an optical arrangement including incident lights and the like from an observed part 26 of the subject into the two cameras 22a and 22b. Although FIG. 2 shows the subject 24 like a flat plate, this is only an example.

In FIG. 2, the twin-lens stereoscopic detector 24 is provided with a left camera 22a, a right camera 22b, and a corresponding pixel finding means (not illustrated). The two cameras 22a and 22b are arranged against the subject 24 so that their optical axes o1 and o2 may be in parallel with each other and at a distance W from each other. And a distance between the observed part 26 of the subject 24 and the two cameras 22a and 22b along the optical axes o1 and o2 is shown by a symbol D. These cameras 22a and 22b can be composed of CCD (charge coupled device) cameras, for example. Each of the cameras 22a and 22b detects an image of a subject as a gradational image. The gradational image is represented by luminance information of a number of pixels arranged in a matrix. The gradational image typically has information representing a density distribution of a subject with multi-value digital signals. Furthermore, the gradational image may have information representing a density distribution of each of colors R (red), G (green), and B (blue) with multi-value digital signals.

The unillustrated corresponding pixel finding means is a means for finding what pixel position in a gradational image obtained by the right camera 22b (hereinafter referred to as a right gradational image) corresponds to the pixel position of a pixel in a matrix of a gradational image of the subject 24 obtained by the left camera 22a (hereinafter referred to as a left gradational image). A result of this finding is represented by information called a phase-different image (a left and right images corresponding information) as described later. The twin-lens stereoscopic detector 14 can be composed by a technique disclosed in literature II for example.

In FIG. 1, the image detecting part 10 is provided furthermore with an image storing part 16 for storing gradational images and a phase-different image detected and generated by the twin-lens stereoscopic detector 14. The image storing part 16 is provided with a gradational image storing part 18 for storing a left and a right gradational image detected by the twin-lens stereoscopic detector 14 and a phase-different image storing part 20 for storing a left and right images corresponding information representing relation between the respective pixels corresponding to the same part (observed part 26) of the subject 24. The gradational image storing part 18 is provided with a left gradational image storing part 18a for storing a left gradational image photographed by the left camera 22a as making the left gradational image correspond to each pixel in a pixel array corresponding to the left gradational image and a right gradational image storing part 18b for storing a right gradational image photographed by the right camera 22a as making the right gradational image correspond to each pixel in a pixel array corresponding to the right gradational image. The phase-different image storing part 20 is a means for storing a phase-different image (a left and right images corresponding information) generated by the corresponding pixel finding means.

The curved surface reconstructing part 12 is provided with a first luminance detecting part 27, an origin pixel setting part 28, a second luminance detecting part 29, a third luminance detecting part 30, a first luminance ratio computing part 32, a second luminance ratio computing part 34, and a depth detecting part 36.

The first luminance detecting part 27 sets as a reference image one of plural gradational images detected by the image detecting part 10. Thereafter the part 27 sets as the first pixel a pixel corresponding to an observed part 26 of the subject out of a number of pixels arranged in a matrix forming this reference image. Then the part 27 detects the first luminance of the first pixel. In this embodiment, the first luminance detecting part 27 sets this right gradational image as the reference image, and invokes the right gradational image from the right gradational image storing part 18b. Then, the part 27 selects as the first pixel a pixel corresponding to the observed part 26 out of the invoked pixel information, and then detects luminance of the first pixel as the first luminance.

The origin pixel setting part 28 is a means which sets as the origin pixel a pixel corresponding to the first pixel out of a number of pixels arranged in a matrix forming a gradational image different from the reference image and thereafter makes pixels correspond to each other by means of the origin pixel. In this embodiment, the origin pixel setting part 28 invokes the left gradational image from the left gradational image storing part 18a and then selects as the origin pixel a pixel corresponding to the first pixel of the right gradational image out of the pixel information.

The second luminance detecting part 29 is a means which sets as the second pixel a pixel distant by the first offset from the origin pixel and then detects the second luminance of the second pixel. The second luminance detecting part 29 of this embodiment is provided with an offset adding part 62a which selects as the second pixel a pixel distant by the first offset from a pixel selected as the origin pixel by the origin pixel setting part 28 and a luminance detecting part 64a which detects as the second luminance a luminance of the second pixel selected by the offset adding part 62a.

The third luminance detecting part 30 is a means for setting as the third pixel a pixel which is on the straight line drawn through the origin pixel and the second pixel. The third pixel is at the opposite side to the second pixel in relation to the origin pixel and is distant by the second offset from the origin pixel. The part 30 detects the third luminance of the third pixel. This third luminance detecting part 30 is provided with an offset adding part 62b which selects as the third pixel a pixel distant by the second offset from a pixel selected as the origin pixel by the origin pixel setting part 28 and a luminance detecting part 64b which detects as the third luminance a luminance of the third pixel selected by the offset adding part 62b.

The first luminance ratio computing part 32 is a means for obtaining the first luminance ratio of the first luminance and the second luminance. The first luminance ratio computing part 32 reads the first luminance detected by the first luminance detecting means 27 and the second luminance detected by the second luminance detecting means 29, and computes a ratio of them (second luminance/first luminance) as the first luminance ratio.

The second luminance ratio computing part 34 is a means for obtaining the second luminance ratio of the first luminance and the third luminance. The second luminance ratio computing part 34 reads the first luminance detected by the first luminance detecting means 27 and the third luminance detected by the third luminance detecting means 30, and computes a ratio of them (third luminance/first luminance) as the second luminance ratio.

The depth detecting part 36 is a means for reconstructing a curved surface of the subject on the basis of the first and the second luminance ratio. The depth detecting part 36 is provided with a first inclination computing part 44, a second inclination computing part 46, a first depth computing part 48, a second depth computing part 50, and an average depth computing part 52.

Next, a process in a method for reconstructing a curved surface of a subject according to the present invention is described hereinafter. Operation of the curved surface reconstructing part 12 is also described together with this curved surface reconstructing method.

First, plural gradational images are detected by photographing a subject from at least two different positions. In this embodiment, the subject 24 is photographed by means of the left camera 22a and the right camera 22b. By this, gradational images seen from the respective positions of the two cameras 22a and 22b are obtained. Photographing can be performed consecutively for time, but since the gist of the invention can be explained by a pair of stereoscopic images in this case, an example of using only a pair of images is described.

Figure 3A:
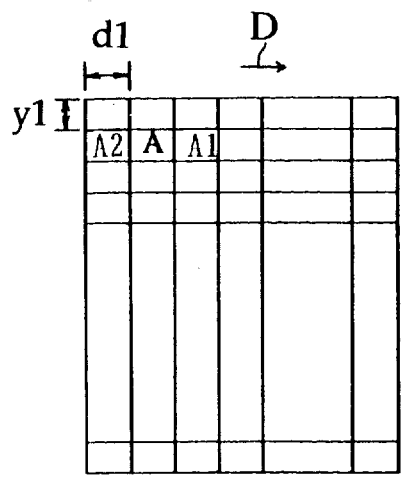
FIGS. 3(A)–3(C), shows figures for explaining a process of making a left and a right image correspond to each other.
Figure 3B:
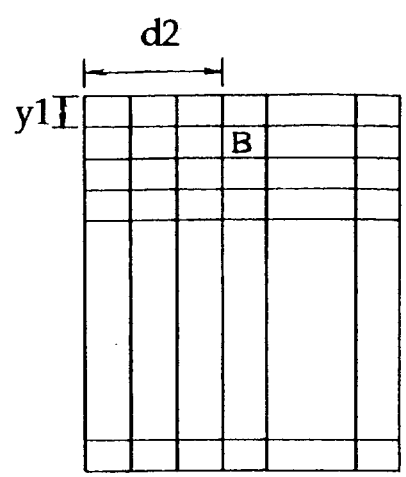
Figure 3C:
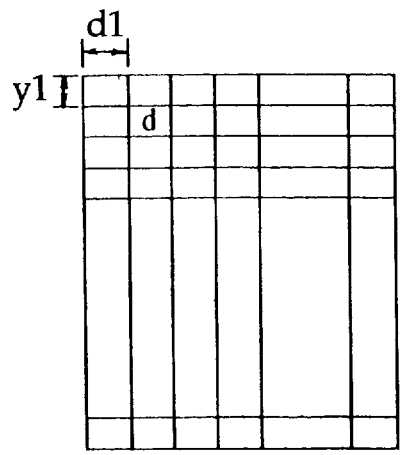

Photographed stereoscopic images (a left gradational image and a right gradational image) are respectively stored into the left gradational image storing part 18a and the right gradational image storing part 18b as they are, and at the same time the corresponding pixels of the left and the right gradational image are found by the twin-lens stereoscopic detector 14 and a left and right images corresponding information (equivalent to the above-mentioned phase-different image) is extracted. Extraction of the left and right images corresponding information is concretely described with reference to FIGS. 3(A) to 3(C). FIG. 3(A) is a figure schematically showing a state inside the left gradational image storing part 18a, FIG. 3(B) is a figure schematically showing a state inside the right gradational image storing part 18b, and FIG. 3(C) is a figure schematically showing a state inside the phase-different image storing part 20. A corresponding pixel retrieving means scans respectively the insides of the left gradational image storing part 18a and the right gradational image storing part 18b. At this time, the corresponding pixel retrieving means finds the corresponding pixels in the left and the right gradational image as detecting, for example, whether or not image parts whose gradations vary in the same way as each other have appeared. FIGS. 3(A) and 3(B) show an example where a pixel "A" at a position (d1, y1) from the origin in the left gradational image and a pixel "B" at a position (d2, y1) from the origin in the right gradational image correspond to each other. According to this, the information d (where d is hereinafter called a phase difference) given by "d=d2−d1" is stored at a position (d1, y1) of the phase-different image storing part 20. A left and right images corresponding information having the right gradational image as the reference image is obtained by finding the corresponding pixels for all pixels of the left and right gradational images in the same way as mentioned above.

It is a matter of course that a left and right images corresponding information may be extracted by using the left gradational image as the reference gradational image.

In this way, one of the left and the right gradational image is set as a reference image. And a pixel corresponding to an observed part 26 of the subject 24 out of a number of pixels in a matrix forming this reference image is set as the first pixel and a luminance of the first pixel is detected as the first luminance. These processes are performed in the first luminance detecting part 27. As a result of these processes, the pixel "B" at a column position d2 in FIG. 3 (B) is set as the first pixel corresponding to the observed part 26 of the subject 24, and a luminance of the first pixel "B", namely, the first luminance Lr (d2) is detected.

Next, a pixel corresponding to the observed part 26 out of a number of pixels in a matrix forming the left gradational image is set as the origin pixel. This process is performed in the said origin pixel setting part 28.

Since the corresponding pixels in the left and the right gradational image are known from the left and right images corresponding information, a pixel in the left gradational image corresponding to the first pixel "B" in the right gradational image can be detected. In FIG. 3 (A), the pixel "A" at a column position d1 is set as the origin pixel corresponding to the observed part 26. A luminance of this origin pixel "A" is represented by a symbol L1 (d1).

And a pixel distant by the first offset from this origin pixel is set as the second pixel and the second luminance of this second pixel is detected.

In this embodiment, the first offset is a displacement quantity of one pixel portion in the row direction in FIG. 3 (A) (the direction indicated by an arrow D in FIG. 3 (A)), and a pixel "A1" at a position (d1+1, y1) distant by one pixel rightward in the row direction from the origin "A" is set as the second pixel. And a luminance of the second pixel "A1", namely, the second luminance L1 (d1+1) is detected. This process is performed in the said second luminance detecting part 29 on the basis of information stored in the image storing part 16. The first offset is not limited to a displacement quantity of one pixel portion as described above but may be a displacement quantity so small as to reflect raggedness of the subject.

Next, a pixel which is on the straight line drawn through the origin "A" and the second pixel "A1", at the opposite side to the second pixel "A1" in relation to the origin, and which is distant by the second offset from the origin "A" is set as the third pixel and the third luminance of the third pixel is detected. The second offset is a displacement quantity of one pixel portion from the origin pixel "A" in the leftward row direction in FIG. 3 (A), and a pixel "A2" at a position (d1−1, y1) distant by one pixel leftward in the row direction from the origin "A" is set as the third pixel. And a luminance of the third pixel "A2", namely, the third luminance L1 (d1−1) is detected. This process is performed in the said third luminance detecting part 30 on the basis of information stored in the image storing part 16. The second offset is not limited to a displacement quantity of one pixel portion as described above but may be a displacement quantity so small as to reflect raggedness of the subject. And the first and the second offset may not be equal in size to each other.

Next, the first luminance ratio H1 of the first luminance Lr (d2) and the second luminance L1 (d1+1) is found. Namely, the first luminance ratio "H1=L1 (d1+1)/Lr (d2)" is computed. This process is performed by receiving output of the second luminance detecting part 29 in the first luminance ratio computing part 32.

And the second luminance ratio H2 of the first luminance Lr (d2) and the third luminance L1 (d1−1) is found. Namely, the second luminance ratio "H2=L1 (d1−1)/Lr (d2)" is computed. This process is performed by receiving output of the third luminance detecting part 30 in the second luminance ratio computing part 34. Computation of the luminance ratio may be performed from any of the left and the right side of a scanning line.

An inclination of a surface of the subject 24 is computed on the basis of the first and the second luminance ratio, and the curved surface of the subject 24 is reconstructed. This process is performed by receiving output of the first and second luminance ratio computing parts 32 and 34 in the depth detecting part 36.

Figure 4A:
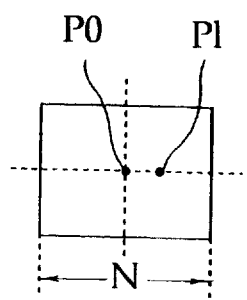
FIGS. 4(A) and 4(B), shows figures for explaining a luminance ratio computing process and an inclination detecting process.
Figure 4B:
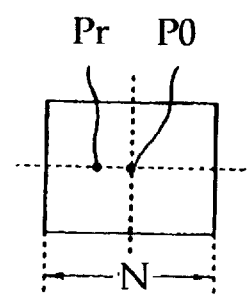

Now, a method for computing an inclination of a surface from a luminance ratio is concretely described with reference to FIG. 2 and FIGS. 4(A) and 4(B). FIG. 4(A) is a figure for explaining a position of a pixel corresponding to the observed part 26 in the left gradational image obtained by the left camera 22a. FIG. 4(B) is a figure for explaining a position of a pixel corresponding to the observed part 26 in the right gradational image obtained by the right camera 22b.

Lambert's cosine law is applied to the observed part 26 of the subject. An inclination of the surface of the observed part can be detected by utilizing that the luminances coming into the two cameras 22a and 22b from this part 26 are different from each other. The intensity L1 of an incident light coming into the left camera 22a from the observed part 26 and the intensity Lr of an incident light coming into the right camera 22b from the observed part 26 are respectively represented by the following expressions (1) and (2);

$$L1 = L0 \times \cos(\beta + \theta 1) \cos \psi \quad (1)$$

$$Lr = L0 \times \cos(\beta + \theta r) \cos \psi \quad (2),$$

where β represents an inclination of the surface of the observed part 26 of the subject 24. In this case, this inclination β is an angle made by a normal line of the surface of the observed part 26 of the subject 24 and the optical axes o1 and o2 (FIG. 2). And ψ is an angle made by the line of sight of the camera (namely, its optical axis) and a normal line of the surface of the subject (therefore this is the same as β). And θ1 is an angle made by the optical axis of the left camera 22a and the line drawn through the left camera 22a and the observed part 26, and θr is an angle made by the optical axis of the right camera 22b and the line drawn through the right camera 22b and the observed part 26. L0 represents the light intensity component in the normal line direction on the surface of the observed part 26.

A luminance ratio H of the corresponding pixels of the left and the right gradational images can be represented by the following expression (3) by means of the said expressions (1) and (2);

$$H = L1/Lr = \cos(\beta+\theta 1)/\cos(\beta+\theta r) \qquad (3).$$

The θ1 in the expression (3) is obtained from a position of a pixel corresponding to the observed part 26 in the left gradational image, and the θr is obtained from a position of a pixel corresponding to the observed part 26 in the right gradational image. Namely, as shown in FIG. 4 (A), the observed part 26 on the line of sight making an angle θ1 with the optical axis of the camera 22*a* appears on a pixel position P1 in an image which is composed of N pixels and has an angle of view α. The P1 is called as a pixel position of an observed part 26 in the left gradational image. Accordingly, the angle θ1 to give the pixel position P1 can be given by the following expression (4);

$$\theta 1 = \tan^{-1}[\{2(P1-P0)/N\} \times \tan(\alpha/2)] \qquad (4),$$

where the symbol P0 represents the central pixel position in the image. In the same way, as shown in FIG. 4(B), the observed part 26 on the line of sight making an angle θr with the optical axis of the camera 22*b* appears on a pixel position Pr in an image which is composed of N pixels and has an angle of view α. The Pr is called as a pixel position of an observed part 26 in the right gradational image. Accordingly, the angle θr to give the pixel position Pr can be given by the following expression (5);

$$\theta r = \tan^{-1}[\{2(Pr-P0)/N\} \times \tan(\alpha/2)] \qquad (5),$$

As clearly known from the expressions (3), (4), and (5), the inclination angle β of the observed part 26 of the subject 24 is obtained on the basis of the luminance ratio of the left and the right image, concretely, on the basis of the luminance ratio of pixels corresponding to each other in the left and the right gradational image, the angle of view α of the cameras 22*a* and 22*b*, the pixel positions of the corresponding pixels in the left and the right gradational image, and the image size N of the left and the right gradational image. Since which should be a numerator or a denominator, the luminance value L1 of the left gradational image or the luminance value Lr of the right gradational image relates to plus or minus of the inclination of a pixel surface, it will do to determine this problem in advance and this is not an essential problem.

And the observed part 26 of the subject 24 is successively shifted to another position and its inclination angle β is detected in the same procedure. A depth differential value "m×tanβ" (where m represents a unit length of one pixel) can be obtained from an inclination angle β of each of the detected parts of the subject, and depth of the subject can be obtained by integrating these depth differential values along the direction of arrangement of the pixels by means of an integrator and the like, and a fine raggedness of the subject can be reconstructed. FIG. 5 shows an example of this. Since the result is obtained usually as a sheet of image, this is a flat image, but for simplifying the explanation, information about only one scanning line in the image is shown here.

Figure 5A:
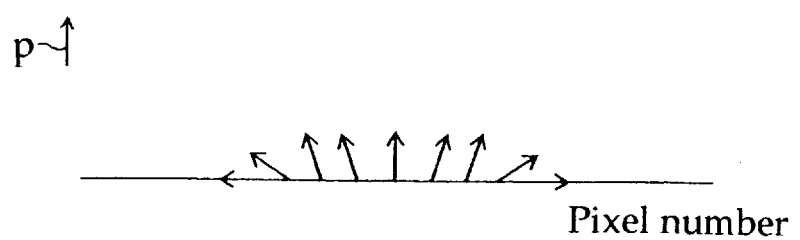
FIGS. 5(A) and 5(B), shows figures for explaining a process of reconstructing inclinations of surfaces of a subject.

FIG. 5(A) is a figure showing an inclination angle of each of plural pixels (exactly speaking, plural observed parts on the subject) along one scanning line by means of a normal line of each of the observed parts. A pixel number of a pixel on a scanning line (horizontal scanning line) is shown on the axis of abscissas, and it is assumed that the optical axes o1 and o2 of the cameras 22*a* and 22*b* exist extensively in the direction perpendicular to the axis of abscissas (in the direction shown by an arrow p in FIG. 5(A)).

FIG. 5(A) shows that the image plane (the surface of the observed part) is inclined to the direction as shown by the arrow in relation to the optical axes o1 and o2 of the cameras 22*a* and 22*b*. When reconstructing a rugged shape of the surface on the basis of the inclination of the image plane by means of an existing process such as integration and the like, a diagram shown in FIG. 5(B) is obtained.

Figure 5B:
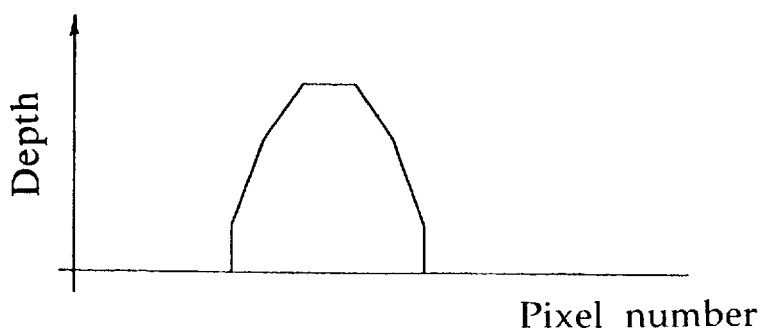

FIG. 5(B) is a diagram showing a state of a curved surface reconstructed from the obtained inclinations of the surfaces, and a pixel number is shown on the axis of abscissas and a depth is shown on the axis of ordinates. Since a unit length m of one pixel is known, if the directions of the normal lines are known, a degree of raggedness (depth differential value) is obtained by means of a trigonometric function. A rugged shape (depth) of one image can be reconstructed by performing such a process all over the image. In this way, an inclination of the surface of an observed part can be obtained on the basis of a luminance ratio of the respective pixels corresponding to the respective observed parts in the left and right gradational image.

On the other hand, in this embodiment, as described above, instead of obtaining a luminance ratio "H=[Lr (d2)/L1 (d1)]" of the pixels corresponding to the observed part 26, the said first and second luminance ratios H1 and H2 are computed which are obtained from the first pixel "B" corresponding to the observed part 26 of the reference image and the respective pixels "A1" and "A2" which are respectively distant by the first offset and the second offset from the origin pixel "A" in the left gradational image corresponding to the first pixel "B". And the inclination β is obtained by applying the said expressions (3), (4), and (5) to the first and second luminance ratios H1 and H2.

Figure 6:
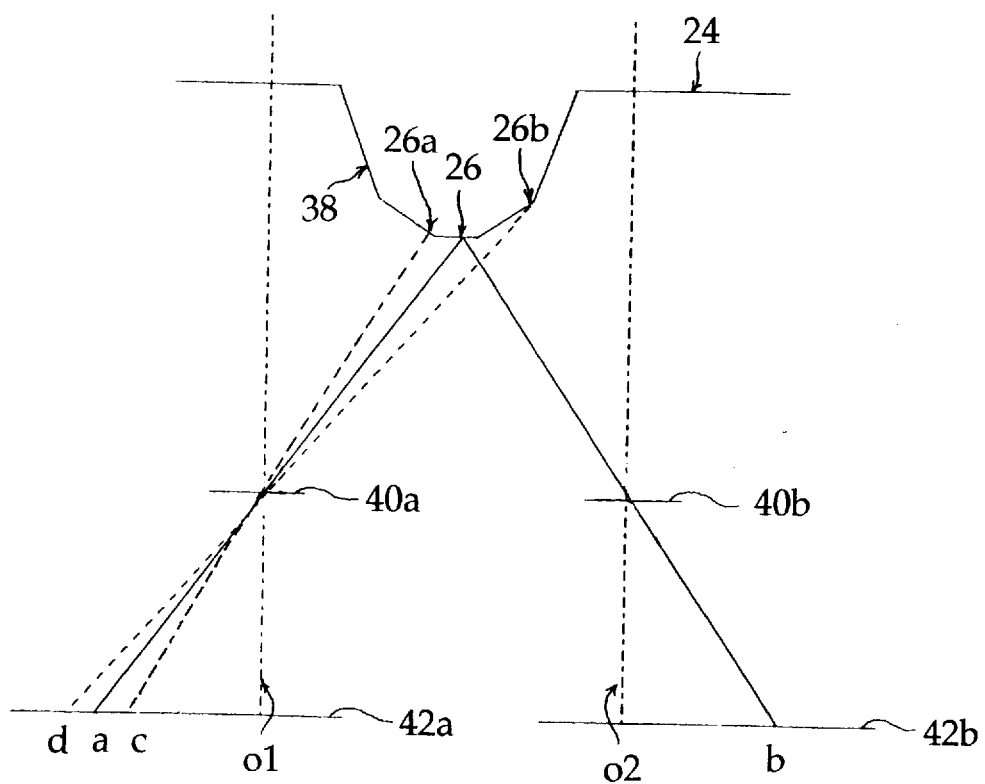
FIG. 6 is a figure showing relation between an observed part and a pixel position.

FIG. 6 is a diagram schematically showing relation between an observed part 26 of a subject 24 having a projection part 38 and a pixel position of a gradational image corresponding to the observed part 26. In FIG. 6, the left camera 22*a* is shown by means of a lens 40*a* and a imaging plane 42*a*, and the right camera 22*b* is shown by means of a lens 40*b* and a imaging plane 42*b*. Therefore, images formed on the imaging planes 42*a* and 42*b*, respectively, correspond to the left and the right gradational images as they are. The left camera 22*a* and the right camera 22*b* are arranged opposite to the subject 24 so that their optical axes o1 and o2 may be in parallel with each other.

In FIG. 6, the tip part of the projection part 38 of the subject 24 is set as the observed part 26, and a light ray which is started from the observed part 26, is condensed by the lens 40*a* and is focused at a position a on the imaging plane 42*a* and a light ray which is started from the observed part 26, is condensed by the lens 40*b* and is focused at a position b on the imaging plane 42*b* are shown by solid lines. It is assumed that the position a on the imaging plane 42*a* corresponds to the origin pixel "A" in the said left gradational image and the intensity of a light reaching this position a is equivalent to the luminance L1 (d1) of the origin pixel "A". And in the same way, it is assumed that the position b on the imaging plane 42*b* corresponds to the origin pixel "B" in the said right gradational image and the intensity of a light reaching this position b on the imaging plane 42*b* is equivalent to the luminance Lr (d2) of the origin pixel "B".

In this embodiment, in case of obtaining an inclination of the surface of the observed part 26, first, the second pixel "A1" and the third pixel "A2" which are respectively distant by the first and the second offset from the origin pixel "A" are obtained as described above. A position on the imaging plane 42a corresponding to the second pixel "A1" is represented by a symbol c, and a position on the imaging plane 42b corresponding to the third pixel "A2" is represented by a symbol d. And a part 26a on the subject 24 corresponding to the position c on the imaging plane 42a and a part 26b on the subject 24 corresponding to the position d on the imaging plane 42a are the parts which are positioned adjacently to and on both sides of the observed part 26.

Next, a process of reconstructing a curved surface of the subject 24 on the basis of the first luminance ratio H1 and the second luminance ratio H2 obtained in the previous process is described in the following.

First, the first inclination β (H1) is computed from the first luminance ratio H1. The first inclination β (H1) can be computed by using the said expressions (3), (4), and (5). At this time it will do that the expressions are computed by substituting a position (d1+1) for the pixel position P1 and substituting a position d2 for the pixel position Pr in the expressions (4) and (5). The first inclination β (H1) obtained here is a quantity nearly equivalent to the inclination of a part 26a on the subject 24 (in this embodiment, since the first pixel corresponding to the observed part 26 in the right gradational image is not processed by an offset process but is fixed as it is, the β (H1) is not exactly equal to the inclination of the surface of the part 26a). This process is performed by receiving output of the said first luminance ratio computing part 32 in the first inclination computing part 44.

Next, the second inclination β (H2) is computed from the second luminance ratio H2. The second inclination β (H2) can be computed by using the said expressions (3), (4), and (5). At this time it will do that the expressions are computed by substituting a position (d1−1) for the pixel position P1 and substituting a position d2 for the pixel position Pr in the expressions (4) and (5). The second inclination β (H2) obtained here is a quantity nearly equivalent to the inclination of a part 26b on the subject 24 (from the above-mentioned reason, the β (H2) is not exactly equal to that of the part 26b). This process is performed by receiving output of the second luminance ratio computing part 34 in the second inclination computing part 46.

Next, the first inclination β (H1) of another observed part 26 is obtained, and the first curved surface is constructed on the basis of these first inclinations β (H1). This process may be performed by detecting respectively the first inclinations β (H1) in the similar procedure as successively shifting the observed part 26 to other positions. A depth differential quantity "m×tanβ (H1)" can be obtained from the first inclination angle β (H1) of each of the detected parts, and depth of the subject can be obtained by integrating these depth differential quantity along the direction of arrangement of the pixels by means of an integrator and the like, and a fine raggedness of the image can be reconstructed.

FIG. 7(A) is a figure showing the inclination angle β (H1) of each of plural pixels (exactly speaking, plural observed parts on the subject) along one scanning line by means of a normal line of each of the observed parts.

This shows that the image plane (the surface of the observed part) is inclined to the direction shown by an arrow in relation to the axes of the cameras 22a and 22b. A pixel number of a pixel on a scanning line (horizontal scanning line) is shown on the axis of abscissas, and it is assumed that the optical axes o1 and o2 of the cameras 22a and 22b exist extensively in the direction perpendicular to the axis of abscissas. When reconstructing a rugged shape of the surface on the basis of the inclination of the image plane by means of an existing process such as integration and the like, a diagram shown in FIG. 7(B) is obtained. FIG. 7(B) is a diagram showing a state of a curved surface reconstructed from the obtained inclinations of the surfaces, and a pixel number is shown on the axis of abscissas and a depth is shown on the axis of ordinates. A rugged shape (depth) of one image can be reconstructed by performing such a process all over the image. A rugged surface constructed on the basis of the first inclination β (H1) is called the first curved surface. The first curved surface is represented by "Σβ (H1)" (this quantity is also called the first depth). This process is performed by receiving output of the first inclination computing part 44 in the first depth computing part 48.

Next, the second inclination β (H2) of another observed part 26 is obtained, and the second curved surface is constructed on the basis of these second inclinations β (H2). In the same way as the process of constructing the first curved surface, this process also is performed by detecting respectively the second inclinations β (H2) in the similar procedure as successively shifting the observed part 26 to other positions. A depth differential value "m×tanβ (H2)" can be obtained from the second inclination angle β (H2) of each of the detected parts, and depth of the subject can be obtained by integrating these depth differential quantity along the direction of arrangement of the pixels by means of an integrator and the like, and a fine raggedness of the image can be reconstructed.

FIG. 7(C) is a figure showing the inclination angle β (H2) of each of plural pixels (exactly speaking, plural observed parts on the subject) along one scanning line by means of a normal line of each of the observed parts.

This shows that the image plane (the surface of the observed part) is inclined to the direction shown by an arrow in relation to the axes of the cameras 22a and 22b. A pixel number of a pixel on a scanning line (horizontal scanning line) is shown on the axis of abscissas, and it is assumed that the optical axes o1 and o2 of the cameras 22a and 22b exist extensively in the direction perpendicular to the axis of abscissas. When reconstructing a rugged shape of the surface on the basis of the inclination of the image plane by means of an existing process such as integration and the like, a diagram shown in FIG. 7(D) is obtained. FIG. 7(D) is a diagram showing a state of a curved surface reconstructed from the obtained inclinations of the surfaces, and a pixel number is shown on the axis of abscissas and a depth is shown on the axis of ordinates. A rugged shape (depth) of one image can be reconstructed by performing such a process all over the image. A rugged surface constructed on the basis of the first inclination β (H2) is called the second curved surface. The second curved surface is represented by "Σβ (H2)" (this quantity is also called the second depth). This process is performed by receiving output of the second inclination computing part 46 in the first depth computing part 50.

Next, an average curved surface of the first and the second curved surface is reconstructed as a curved surface of the subject 24. This process finds an average depth by taking an average of the first and the second curved surface previously obtained, namely, by averaging the first and the second depth representing these curved surfaces, and obtains a curved surface on the basis of this average depth as an average curved surface of the first and the second curved surface. Namely, this process obtains an average curved surface (average depth) "[Σβ (H1)+Σβ (H2)]/2". In this embodiment, this average curved surface is assumed to be a curved surface of the subject 24.

As an example, FIG. 7(E) shows an average curved surface of the first and the second curved surface (FIGS. 7(B) and 7(D)). FIG. 7(E) is a figure showing a state of an average curved surface obtained from the first and the second curved surface, and a pixel number is shown on the axis of abscissas and a depth is shown on the axis of ordinates. The said process is performed by receiving output of the first and second depth computing parts 48 and 50 in the average depth computing part 52.

As described above, a curved surface of the subject may be reconstructed by obtaining the first luminance ratio H1 and the second luminance ratio H2, computing an inclination for each of them, reconstructing a curved surface on the basis of these inclinations, and obtaining an average curved surface, or a curved surface of the subject may be obtained by obtaining the first luminance ratio and the second luminance ratio, taking an average of these luminance ratios, obtaining an average inclination on the basis of the average luminance ratio, and reconstructing a curved surface on the basis of the average inclination. Since the former case has been described, examples of a method and an apparatus in the latter case are described in the following.

Figure 8:
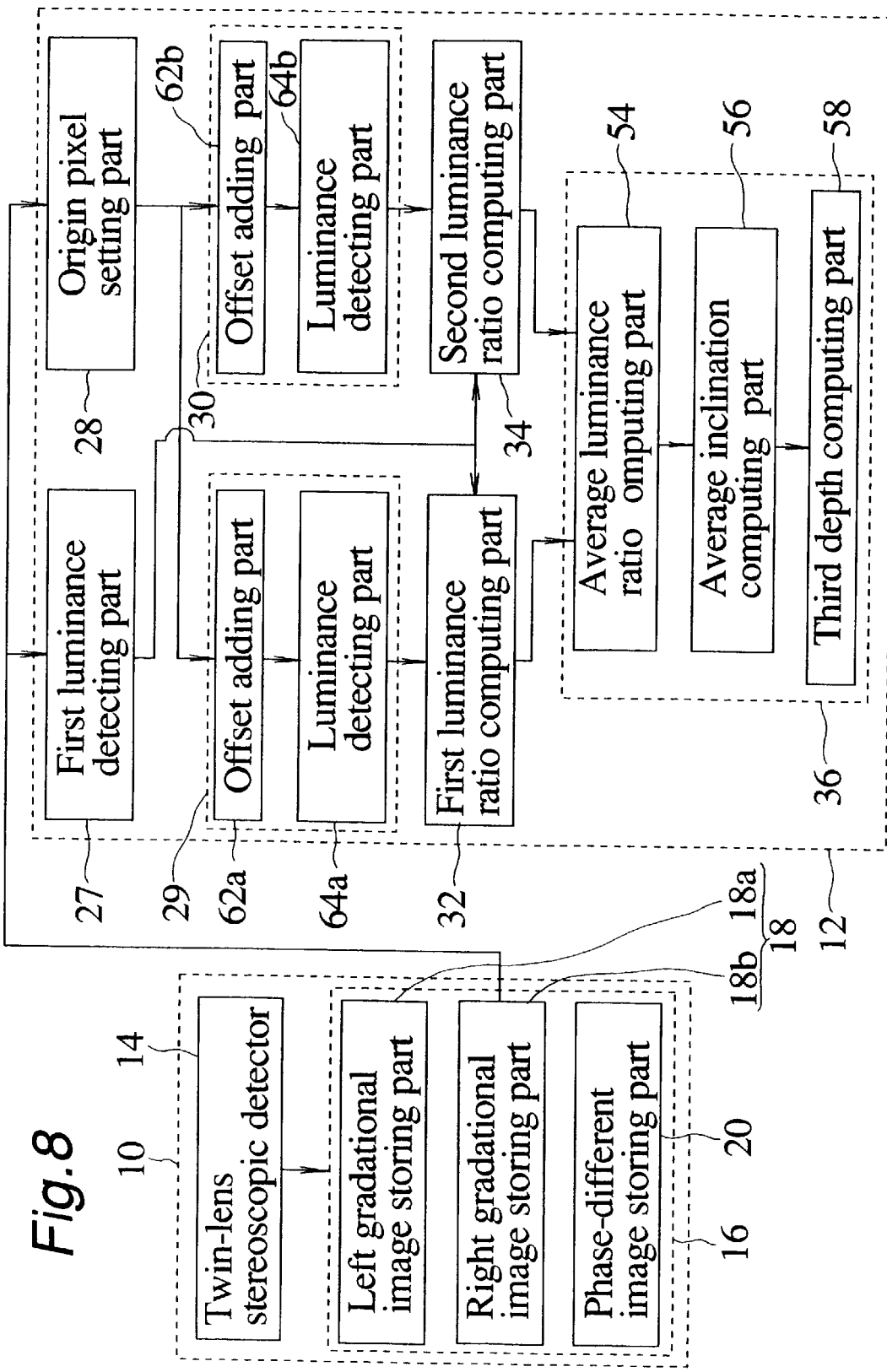
FIG. 8 is a block diagram showing composition of a variation example of an apparatus for reconstructing a curved surface of a subject according to the first embodiment.

FIG. 8 is a block diagram showing a variation example of an apparatus for reconstructing a curved surface of a subject according to the first embodiment. Since this is only different in composition of the depth detecting part 36 from the apparatus explained with reference to FIG. 1, the composition of the depth detecting part 36 is described. The depth detecting part 36 of this variation example is provided with an average luminance ratio computing part 54, an average inclination computing part 56, and a third depth computing part 58.

The average luminance ratio computing part 54 is a means for obtaining an average luminance ratio of the first and the second luminance ratio, and outputs an average luminance ratio by processing outputs of the first and second luminance ratio computing parts 32 and 34.

The average inclination computing part 56 is a means for computing an average inclination from an average luminance ratio. The average inclination computing part 56 takes in as an input an average luminance ratio outputted from the average luminance ratio computing part 54 and computes and outputs an average inclination, using this average luminance ratio.

The third depth computing part 58 is a means for computing the third depth on the basis of an average inclination and reconstructing a curved surface of the subject on the basis of the third depth. The third depth computing part 58 computes the third depth from an average inclination outputted from the average inclination computing part 56. And the third depth computing part 58 computes the third depth (average curved surface) on the basis of an average inclination obtained by shifting an observed part on the subject and reconstructs a curved surface of the subject. This variation example can implement an apparatus having the same effect as the said apparatus for reconstructing a curved surface of a subject according to the first embodiment.

As described above, a method for reconstructing a curved surface of a subject according to the first embodiment is a method which obtains an inclination of the surface of the first observed part of the subject by obtaining inclinations of the second and third observed parts which are adjacent to the first observed part and different from each other, respectively, as the first and second inclinations and taking an average of these first and second inclinations. In this way, since instead of obtaining an inclination of the surface of one part of a subject as observing only the one part this method obtains an inclination of the surface of one part of the subject by obtaining inclinations of the surfaces of parts adjacent to the observed part and taking an average inclination of these inclinations as the inclination of said observed part, this method can reconstruct a more accurate curved surface through taking in continuity of the shape of a curved surface of the subject.

Next, an effect of a method for reconstructing a curved surface of a subject according to this embodiment is described in the following. As described above, up to now, "H=L1 (d1)/Lr (d2)" is used as a luminance ratio, an inclination is obtained on the basis of the luminance ratio H, and a depth is obtained, and then a curved surface of a subject has been reconstructed. However, due to an insufficient accuracy of measurement, a phase difference which is a quantity showing a position on the subject sometimes has not shown variations corresponding to a rugged part of the subject. Namely, the rugged part has been detected sometimes as if it is flat without perceiving variations in values of pixels corresponding to the rugged part. Therefore, when computing a luminance ratio using a detected phase difference, a curved surface which does not have the rugged part has been sometimes reconstructed on the subject. This means also that a luminance ratio of a part different in position from the actual observed part has been computed. In this way, since detection of a position on a subject is uncertain and the absolute values L1 (d1) and Lr (d2) of luminance cannot be accurately detected, it has been difficult to detect a fine rugged part which should actually exist on the subject.

Figure 9:
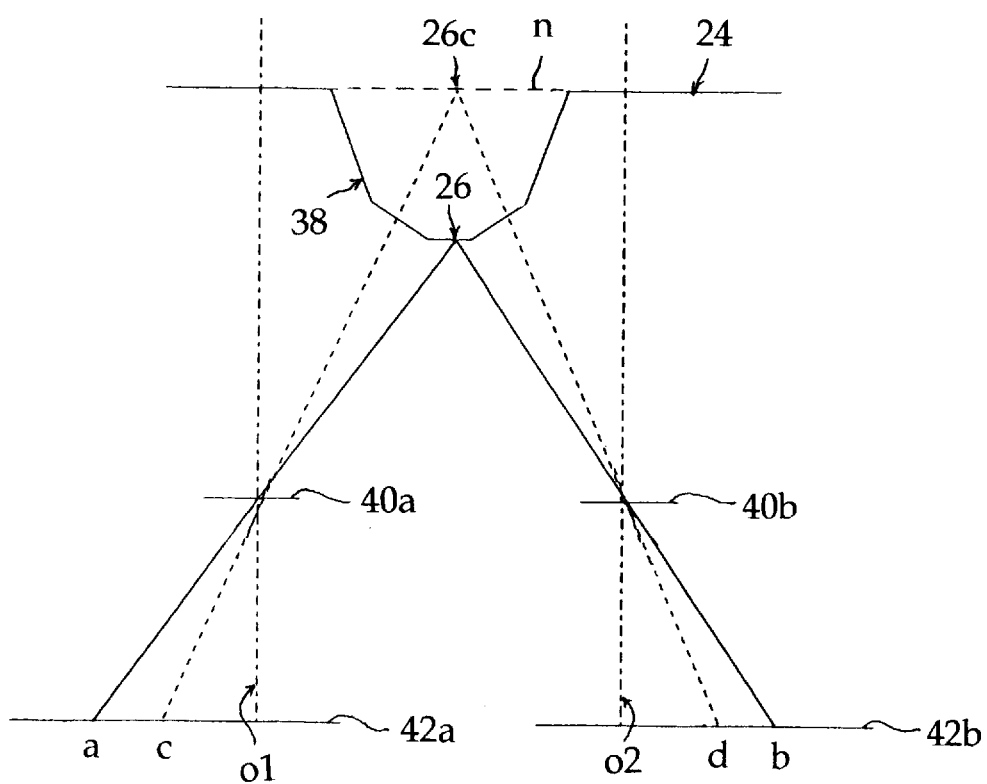
FIG. 9 is a figure showing relation between an observed part and a pixel position.

For example, FIG. 9 shows schematically relation between an observed part and its pixel position. When taking the tip part of a projection part 38 on a subject 24 as an observed part 26, a light ray which is started from the observed part 26, is condensed by a lens 40a, and is focused on a position a on a imaging plane 42a and, in the same way, a light ray which is started from the observed part 26, is condensed by a lens 40b, and is focused on a position b on a imaging plane 42b are represented by solid lines in FIG. 9. And in the same figure, when the subject 24 has a flat surface (a surface shown by a dashed line in FIG. 9) instead of the projection part 38, a light ray which is started from the observed part 26c on the flat surface, is condensed by a lens 40a, and is focused on a position c on a imaging plane 42a, and, in the same way, a light ray which is started from the observed part 26c, is condensed by a lens 40b, and is focused on a position d on a imaging plane 42b are represented by dashed lines.

Figure 10:
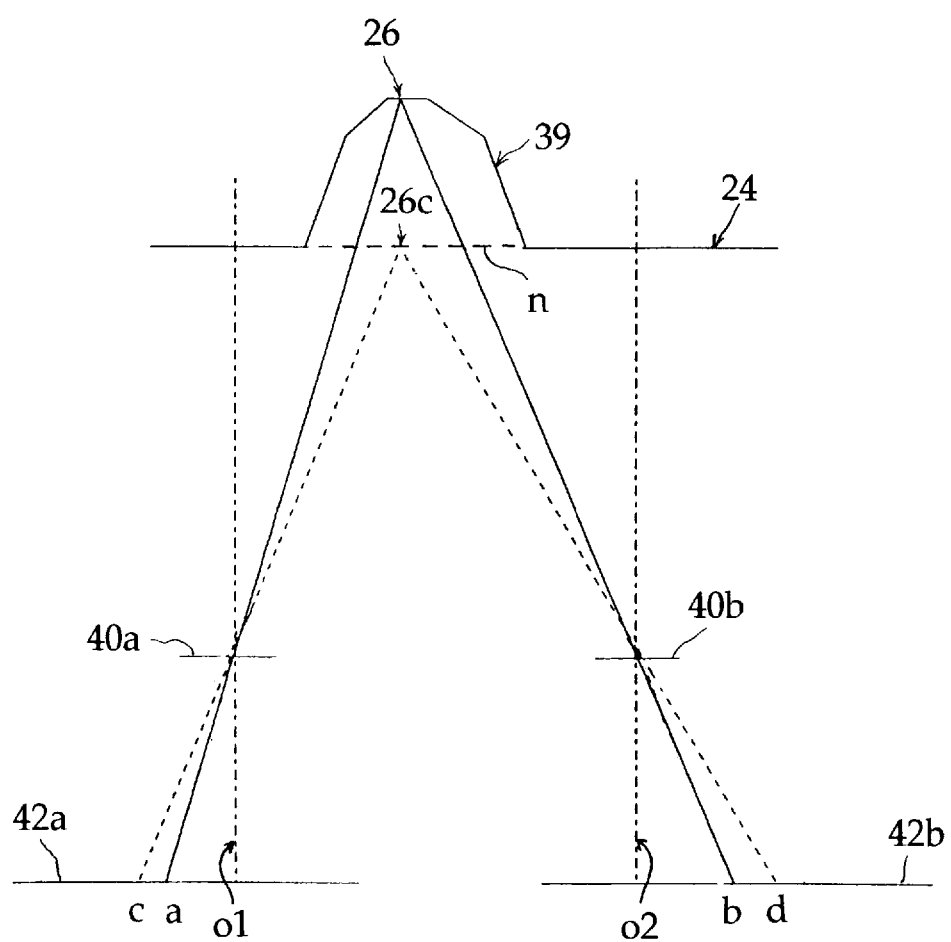
FIG. 10 is a figure showing relation between an observed part and a pixel position.

As clearly known from FIG. 9, when the projection part 38 is small and a distance between the observed part 26 and the observed part 26c on the flat surface is small, a distance between the positions a and c on the imaging plane 42a or between the positions b and d on the imaging plane 42b is sometimes so small that these positions cannot be discriminated from each other. Therefore, no variation in phase difference can be perceived between when setting the top surface of the projection part 38 as a phase difference detecting plane and when setting the flat surface n as a phase difference detecting plane. Although a case where the subject 24 has a projection part 38 has been explained in FIG. 9, the same problem has happened also in case that the subject has a hollow part 39 instead of the projection part 38 (in FIG. 10, the symbols except the hollow part 39 correspond to the symbols in FIG. 9).

On the other hand, as described above, according to a method for reconstructing a curved surface of a subject of this embodiment, a curved surface of a subject is reconstructed by applying the said expressions (3), (4), and (5) to the pixels which are distant, respectively, by the first and the second offset from a pixel in one gradational image corresponding to an observed part. Namely, a curved surface is reconstructed on the basis of the first and the second luminance ratio by measuring the first luminance ratio "H1=L1 (d1+1)/Lr (d2)" and the second luminance ratio "H2=L1 (d1−1)/Lr(d2)" instead of being reconstructed on the basis of a luminance ratio "H=L1 (d1)/Lr (d2)" which has been measured up to now. In this case, the second luminance L1 (d1+1) is represented by the following expression (6);

$$L1(d1+1)=L1\ (d1)+\Delta 1 \quad (6).$$

And the third luminance L1 (d1−1) is represented by the following expression (7);

$$L1\ (d1-1)=L1\ (d1)-\Delta 2 \quad (7).$$

In this embodiment, an average value of the first luminance ratio H1 and the second luminance ratio H2 obtained by measurement is taken as a luminance ratio (average luminance ratio) of an observed part of the subject. Namely, an average luminance ratio H0 to be obtained can be represented by the following expression (8);

$$\begin{aligned} H0 &= (H1+H2)/2 \quad (8)\\ &= \{L1(d1+1)+L1(d1-1)\}/(2Lr(d2))\\ &= \{L1(d1)+\Delta 1+L1(d1)-\Delta 2\}/(2Lr(d2))\\ &= L1(d1)/Lr(d2)+(\Delta 1-\Delta 2)/(2Lr(d2)) \end{aligned}$$

As described above, in this embodiment, since the first and the second offset are limited within a range where a subject can be considered as a continuum, it may be thought that "$\Delta 1 \approx \Delta 2$". Accordingly, it is possible to use the luminance ratio H0 represented by the expression (8) instead of an original luminance ratio H. In this way, it will be understood that even if the luminance value L1 (d1) cannot be accurately measured in fact, a luminance ratio on the surface of an observed part can be obtained according to this method.

In this way, according to a method for reconstructing a curved surface of a subject of this embodiment, it is possible to correct a distribution of luminance on a subject and a distortion of luminance ratio due to arrangement of cameras by means of a technique of this embodiment using the first and the second offset. Thus, since a luminance ratio can be measured more accurately than the prior art, a curved surface of a subject can be reconstructed more accurately.

And as an integrating method for computing a depth from an inclination, it is preferable to use a method which, for example, makes successively integration for parts on a subject which have the same phase difference and resets the integrated value at a starting value of integration when a variation greater than a specified phase difference appears, and then makes integration for a part on the subject having the next specified phase difference. In this way, the integration is performed, setting as an integral interval a range where the corresponding pixels whose luminance ratio is to be obtained can be treated as they have the same phase difference.

Figure 11A:
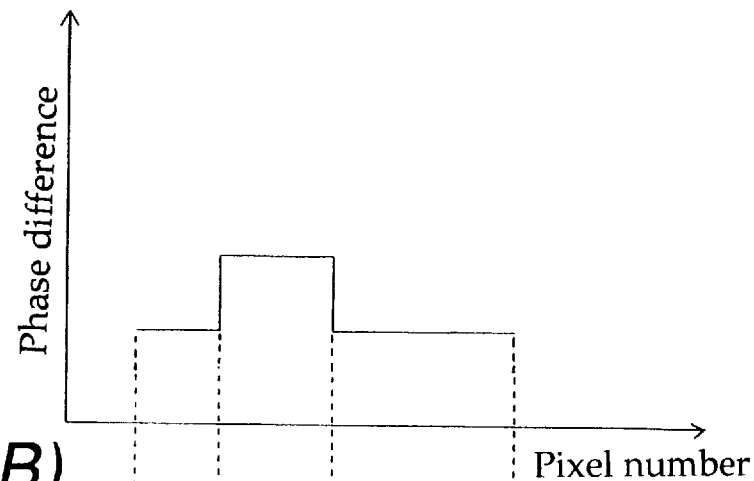
FIGS. 11(A)–11(C), is a figure for explaining an integration method.
Figure 11B:
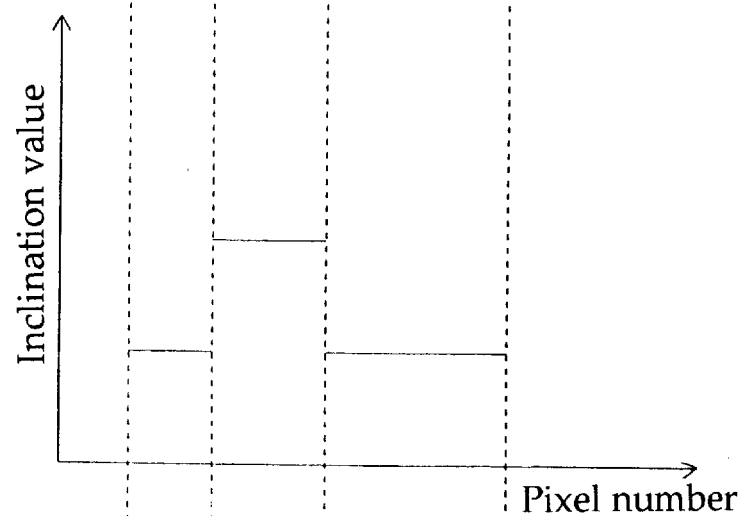
Figure 11C:
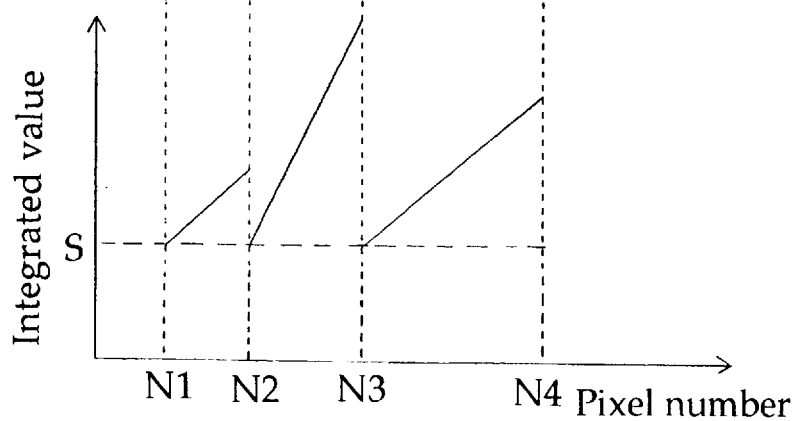

FIG. 11 is a diagram for explaining this integrating method. In FIG. 11, the upper graph is a graph showing relation between pixel numbers and phase differences, the middle graph is a graph showing relation between pixel numbers and inclination values, and the lower graph is a graph showing relation between pixel numbers and integrated values. A pixel number is shown on the axis of abscissas in each graph, and these graphs show the same pixel number with the same abscissa as one another. The integration is performed for each scanning line in the image plane (gradational image) along the direction of arrangement of the cameras.

In FIG. 11, the integration is progressed from a pixel number N1 to a pixel number N4. A starting value of integration is represented by a symbol S. The first integration is started at the pixel number N1, and since a phase difference is changed at the pixel number N2, the first integration is ended. And the integrated value is reset at the starting value of integration at this pixel number N2. Next, the second integration is started at the pixel N2, and since a phase difference is changed at the pixel number N3, this second integration is ended. In the same way, at the pixel N3 the integrated value is reset at the starting value of integration and next, the third integration is started and continued until the pixel number reaches N4.

This integrating method is an integrating method based on an empirical law that in general there are subjects dispersedly in the direction of distance and the same subject exists within a certain phase difference. According to this integrating method, since an integral interval of a subject can be automatically set according to variation in phase difference, it is not necessary to perform an integral interval, determining operation as required in the prior art (see literature III "THE TRANSACTIONS OF THE INSTITUTE OF ELECTRONICS, INFORMATION, AND COMMUNICATION ENGINEERS OF JAPAN, PART D-II vol. J76-D-II No. 10, pp. 2243–2246, October 1993"). Accordingly, this method dispenses with a troublesome operation such as using the brightest point in an image as an initial value for integration or starting integration after obtaining an integration starting point to minimize an error of the initial inclination value as required up to now (literature III).

And according to this integrating method, since a phase difference of a subject can be obtained as the same value even in case that the subject has various colors, it is possible to consecutively perform integration. Accordingly, this method makes unnecessary such an operation as changing an integral interval for each color as required up to now. In this way, it is possible to solve a disadvantage that a two-dimensional image should have been divided according to its brightness or a disadvantage that an integration starting point should have been determined separately as required in the prior art.

Furthermore, this method can reconstruct a fine rugged part by superposing the raggedness (depth) obtained by the said integrating method on the rough rugged part reconstructed by means of phase differences obtained from stereoscopic images. Unbalance of accumulated integral noises can be reduced by setting the direction of integration as the respective directions reverse to each other, namely, the forward direction and the backward direction of a horizontal scanning line for the first and the second offset. Since as for the scanning direction of integration it will do to average the results of the leftward scanning and the rightward scanning of a scanning line, the scanning direction of integration may be changed for each specified phase difference in an image. The integration may be performed in parallel separately for each phase difference. And in case of using this integrating method, it is preferable that each of the first depth computing part 48, the second depth computing part 50, and the third depth computing part 58 described above as an apparatus for reconstructing a curved surface of a subject is provided with a means for judging whether or not an interval where the integration is being performed is within a specified phase difference, namely, a means for setting an integral interval.

For example, in case that a distance between a subject and cameras is about 1 m, the camera's angle of view is about 13 degrees, an interval between the two cameras is about 6.5 cm, and the camera's CCD has pixels of 640×480 or so, a system relying upon only an existing technique using a phase-different image, namely, using stereoscopic images can have a distance resolution of only at least several centimeters and can only give a flat image in case of measuring a person's face and the like, but according to a method for reconstructing a curved surface of a subject as described above in this embodiment, it is possible to obtain a rugged part such as its nose and the like. In this way, the invention can relieve a problem that there is a difference in raggedness between an obtained image and the real image and a proper luminance ratio cannot have been obtained between pixels corresponding to each other since a phase-different image obtained from the stereoscopic images by a stereoscopic photography is flat due to relation between a luminance and reflection characteristic of a subject and arrangement of cameras. Therefore, the invention can implement a three-dimensional shape reconstructing apparatus for making it possible to reconstruct a curved surface more accurately than the prior art.

And according to a method for reconstructing a curved surface of a subject of this embodiment, it is not necessary to use the absolute value of luminance. Accordingly, an inclination map becomes unnecessary and measurement can be performed under various conditions. And since a subject is not limited in color or brightness, a reflectivity map is not necessary and environments for photographing can be more widely diversified. Since the system is not influenced by position of a light source, it is not necessary to prepare a light source position as a parameter as required in the prior art and so the apparatus can be simplified. Furthermore, since the system obtains an initial value of inclination of a surface at an edge (a changing point of phase difference) of a phase-different image, there is an advantage of requiring no extra process such as detection of an integral interval or selection of an initial value of integration. And since even a subject having various colors can be consecutively integrated, it is not necessary to set an integral interval for each color as required in the prior art and the apparatus can be simplified.

Although the first and the second offset have been set in pixels, a smaller offset than a pixel unit can be utilized, for example, by computing a value between pixels by taking a weighted average of the pixels adjacent to each other. A luminance ratio of a pixel may be obtained by taking an average of pixels of 3×3 surrounding this pixel. Furthermore, a luminance ratio may be quantized as a gradation value. And by using a multi-lens stereoscopic imaging apparatus instead of a twin-lens stereoscopic imaging apparatus, the technique described in this embodiment may be applied to each pair of gradational images. Still further, the technique of this embodiment can be also applied after obtaining a depth image or a left and right images corresponding information (phase-different image) by means of another means without photographing a subject by means of a twin-lens stereoscopic detector. For example, gradational images photographed from plural positions may be obtained by moving a camera.

Second Embodiment

Figure 12:
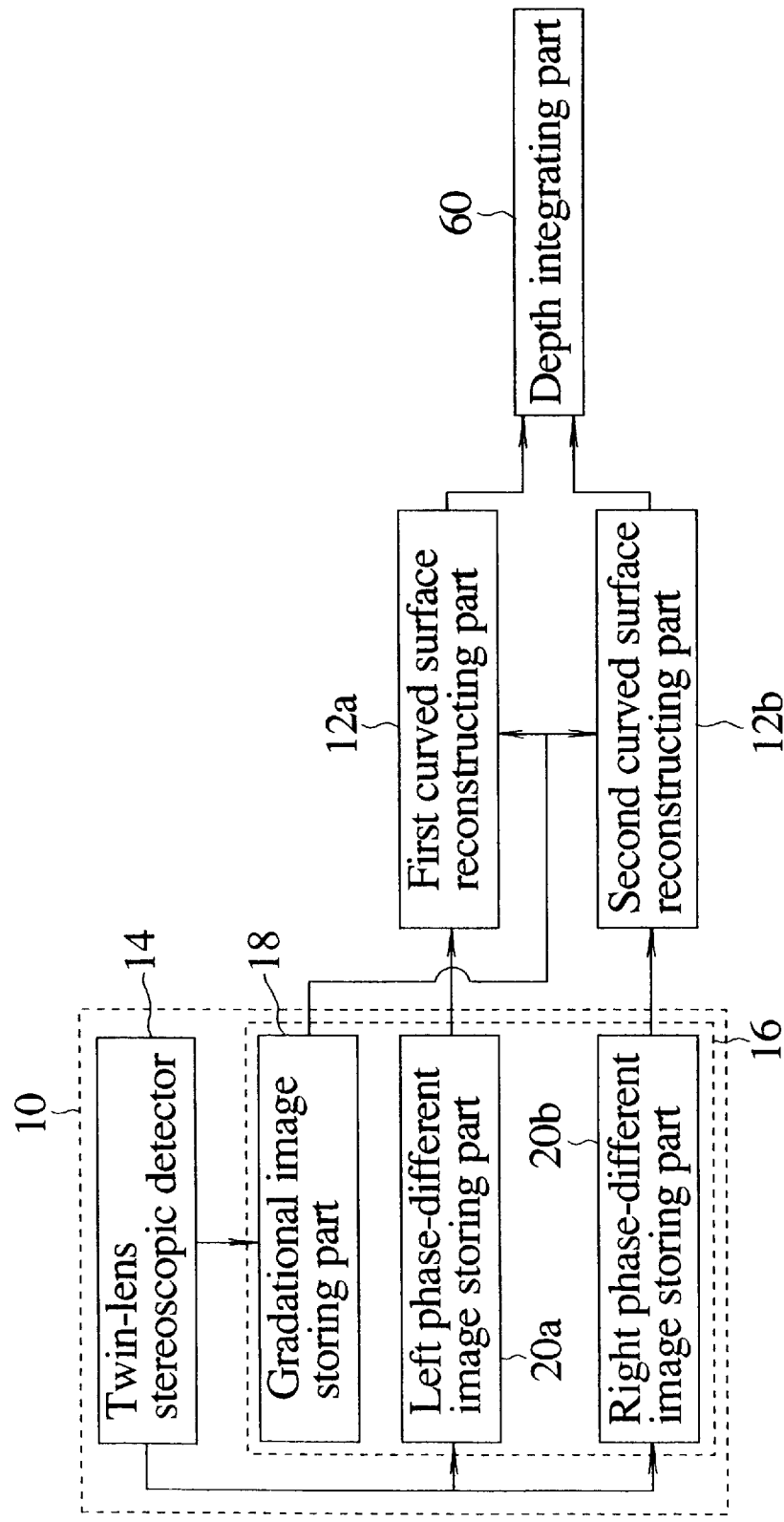
FIG. 12 is a block diagram showing composition of an apparatus for reconstructing a curved surface of a subject according to a second embodiment.

FIG. 12 is a block diagram showing composition of an apparatus for reconstructing a curved surface of a subject according to a second embodiment. The second embodiment is provided with plural stages of the above-mentioned curved surface reconstructing parts 12 for each of which a different gradational image is set as a reference image, and a depth integrating part 60 for obtaining a depth of a subject by integrating preliminary depths outputted from these curved surface reconstructing parts 12. This embodiment is provided with two curved surface reconstructing parts 12, and FIG. 12 shows them respectively as a first curved surface reconstructing part 12a and a second curved surface reconstructing part 12b. And FIG. 12 shows a left gradational image storing part 18a and a right gradational image storing part 18b in a lump as a gradational image storing part 18. Furthermore, FIG. 12 separates a phase-different image storing part 20 into a left phase-different image storing part 20a and a right phase-different image storing part 20b to show them.

In this case, a left phase-different image means a phase-different image in case of setting a right gradational image as a reference image, and a right phase-different image means a phase-different image in case of setting a left gradational image as a reference image. The left and the right phase-different image are respectively stored in the left phase-different image storing part 20a and the right phase-different image storing part 20b. And they are composed so that a left phase-different image stored in the left phase-different image storing part 20a may be outputted to the first curved surface reconstructing part 12a and a right phase-different image stored in the right phase-different image storing part 20b may be outputted to the second curved surface reconstructing part 12b. In this way, this embodiment is composed so that the first curved surface reconstructing part 12a may set a left gradational image as a reference image and process it as described in the first embodiment, and the second curved surface reconstructing part 12b may set a right gradational image as its reference image and process it as described in the first embodiment. And outputs of the first and second curved surface reconstructing parts 12a and 12b are inputted into the depth integrating part 60. And the first preliminary depth obtained by the first curved surface reconstructing part 12a and the second preliminary depth obtained by the second curved surface reconstructing part 12b are integrated in the depth integrating part 60, and a curved surface of a subject is reconstructed by using the depth obtained as a result of this integration.

It is preferable to take a weighted average as this integration. Namely, an image seen from a position between a left camera and a right camera can be represented by a depth computed through taking a weighted average of a preliminary depth obtained by the first curved surface reconstructing part 12a and a preliminary depth obtained by the second curved surface reconstructing part 12b. For example, in case that their weights are respectively 0.5, an image seen from the middle position between the two cameras is obtained, and in case that their weights are respectively 0.7 for the left and 0.3 for the right, an image seen from a position slightly near to the left camera.

Figure 13:
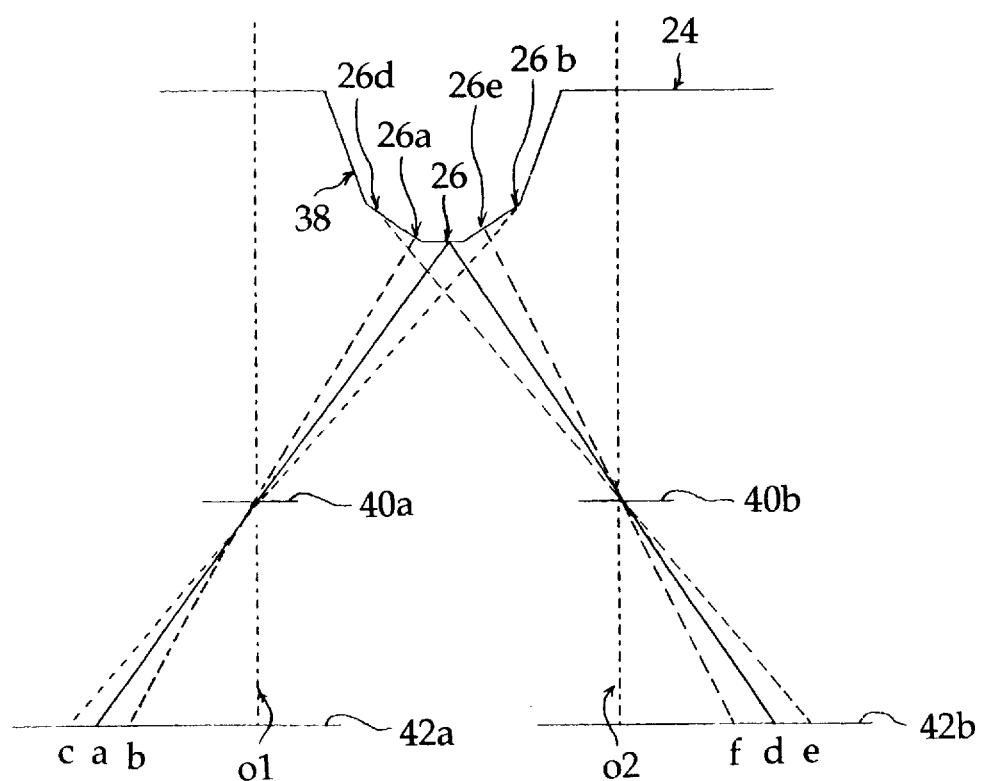
FIG. 13 is a figure showing relation between an observed part and a pixel position.

FIG. 13 is a diagram schematically showing relation between an observed part and a pixel position. In this embodiment, first, a right image is set as a reference image, and pixels (pixels, respectively, corresponding to imaging positions b and c in FIG. 13, namely, pixels in the left gradational image, respectively, corresponding to observed parts 26a and 26b) which are distant, respectively, by the first and the second offset from the origin pixel in the left gradational image (a pixel corresponding to an imaging position a in FIG. 13, namely, a pixel in the left gradational image corresponding to an observed part 26) are obtained as described in the first embodiment, and then the above-mentioned process succeeding to this is performed. Next, a left image is set as a reference image, and as applying a process described in the first embodiment, pixels (pixels, respectively, corresponding to imaging positions e and f in FIG. 13, namely, pixels in the right gradational image, respectively, corresponding to observed parts 26d and 26e) which are distant, respectively, by the first and the second offset from the origin pixel in the right gradational image (a pixel corresponding to an imaging position d in FIG. 13, namely, a pixel in the right gradational image corresponding to an observed part 26) are obtained, and then the above-mentioned process succeeding to this is performed. The first and the second offsets may be different in size in case of setting the left gradational image as the reference image and in case of setting the right gradational image as the reference image. In order to avoid complication of the explanation, in this embodiment, it is assumed that all the offsets are one pixel portion in size.

In case that the right gradational image has been set as the reference image, the respective luminance ratios H1 and H2 corresponding to the first and the second offset can be represented by the following expressions in the same way as the first embodiment;

$$H1 = L1\ (d1+1)/Lr\ (d2)$$

$$H2 = L1\ (d1-1)/Lr\ (d2).$$

And in case that the left gradational image has been set as the reference image, the respective luminance ratios H3 and H4 corresponding to the first and the second offset can be represented by the following expressions;

$$H3 = L1\ (d1)/Lr\ (d2+1)$$

$$H4 = L1\ (d1)/Lr\ (d2-1).$$

These luminance ratios H1, H2, H3, and H4 are respectively processed in the curved surface reconstructing parts 12a and 12b, and first, inclinations β (H1), β (H2), β (H3), and β (H4) are obtained. And depths Σβ (H1), Σβ (H2), Σβ (H3), and Σβ (H4) are obtained from these β (H1), β (H2), β (H3), and β (H4). And then a preliminary depth "{Σβ (H1)+Σβ, (H2)}/2" is outputted from the first curved surface reconstructing part 12a, and a preliminary depth "{Σβ (H3)+Σβ (H4)}/2" is outputted from the second curved surface reconstructing part 12b. These preliminary depths are inputted into the depth integrating part 60, in which a weighted average of them is taken. For example, when representing their weights with A and B (where A+B=1, A>0 and B>0), a value;

A×{Σβ (H1)+Σβ (H2)}/2+B×{Σβ (H3)+Σβ (H4)}/2 is outputted. As described above, for example, supposing that A=B=0.5, a three-dimensional shape obtained by seeing a subject at the middle position between the left and right camera can be reconstructed.

Since a method for reconstructing a curved surface of a subject of the present invention is a method of obtaining an inclination of a surface of an observed part by obtaining inclinations of parts adjacent to the observed part and taking an average of them instead of a method of obtaining an inclination of an observed part as observing this single part of the subject, a curved surface reconstructed on the basis of the inclination obtained by this method has taken in continuity of the shape of a curved surface of the subject and a more accurate curved surface can be reconstructed.

According to another method of the invention, by obtaining inclinations of two parts adjacent to an observed part of a subject and taking an average inclination of them as the inclination of the surface of the observed part, it is possible to suppress oversight of a fine raggedness which oversight has been caused by insufficiency of a detecting accuracy in detecting a position of the observed part or a luminance value of a pixel corresponding to the observed part in case of obtaining a luminance ratio and computing an inclination for a single observed part.

And according to a preferred embodiment of a method for reconstructing a curved surface of a subject of the invention, in case of setting each of plural gradation images as a reference image, it is possible to reconstruct a curved surface of a subject as shifting a viewing position by obtaining the respective preliminary depths and taking a weighted average of these preliminary depths.

Next, according to a method for reconstructing apparatus of the invention, since it obtains inclinations of two parts adjacent to an observed part of a subject and takes an average inclination of these inclinations as the inclination of the observed part, it is possible to suppress oversight of a fine raggedness on the subject which oversight has been caused by insufficiency of a detecting accuracy in detecting a position of the observed part or a luminance value of a pixel corresponding to the observed part in case of obtaining a luminance ratio and computing an inclination for a single observed part.

And according to a preferred embodiment of an apparatus for reconstructing a curved surface of a subject of the invention, in case of setting each of plural gradation images as a reference image, it is possible to provide an apparatus capable of reconstructing a curved surface of a subject as shifting a viewing position by integrating the preliminary depths respectively obtained.

In an apparatus for reconstructing a curved surface of a subject of the invention, it is preferable that said depth integrating part is a means for taking a weighted average of the preliminary depths as the depth of the subject.

What is claimed is:

1. A method for reconstructing a curved surface of a subject, comprising the steps of:

photographing a subject from at least two different positions, detecting each gradational image seen from each of the respective positions, computing a luminance ratio of pixels corresponding to each other in the different gradational images, and computing an inclination of the curved surface of said subject on the basis of the luminance ratio and including the steps of:

(1) obtaining inclinations of the surfaces of a second and a third observed part which are adjacent to the first observed part and are different from each other, respectively, as a first and a second inclination, (2) taking an average of the first and the second inclination, and (3) obtaining an inclination of the surface of a first observed part of said subject on the basis of the average inclination.

2. A method for reconstructing a curved surface of a subject, comprising the steps of (a) photographing a subject from at least two different positions and detecting each gradational image seen from each of the respective positions, (b) computing a luminance ratio of pixels corresponding to each other in said different gradational images, and (c) reconstructing a curved surface of said subject through computing an inclination of the surface of said subject on the basis of the luminance ratio, wherein;

said step (b) including the steps of;

(b-1) setting one of said gradational images as a reference image, setting as the first pixel one pixel corresponding to an observed part of said subject out of a number of pixels arranged in a matrix forming this reference image, and detecting the first luminance of the first pixel, (b-2) setting, as the origin pixel, one pixel corresponding to said observed part out of a number of pixels arranged in a matrix forming said one gradational image different from said reference image, setting the second pixel a pixel distant by the first offset from this origin pixel, and detecting the second luminance of the second pixel, (b-3) setting, as the third pixel, a pixel which is on the straight line drawn through said origin and said second pixel and is at the opposite side to said second pixel in relation to said origin pixel and is distant by the second offset from said origin pixel, and detecting the third luminance of the third pixel, (b-4) obtaining the first luminance ratio of said first luminance and said second luminance, and (b-5) obtaining the second luminance ratio of said first luminance to said third luminance, and furthermore said step (c) including the steps of;

(c-1) a step of reconstructing a curved surface of said subject through computing a surface inclination of said subject on the basis of said first and said second luminance ratio.

3. A method for reconstructing a curved surface of a subject as defined in claim 2, wherein said step (c-1) including the steps of;

(h1) computing the first inclination from said first luminance ratio, (h2) computing the second inclination from said second luminance ratio, (h3) obtaining said first inclination of an observed part different from said observed part and constructing the first curved surface on the basis of these first inclinations, (h4) obtaining said second inclination of an observed part different from said observed part and constructing the second curved surface on the basis of these second inclinations, and (h5) reconstructing a curved surface of said subject through setting an average curved surface of said first and said second curved surface as the curved surface of said subject.

4. A method for reconstructing a curved surface of a subject as defined in claim 2, wherein said step (c-1) including the steps of:

(i1) obtaining an average luminance ratio of said first and said second luminance ratio, (i2) computing an average inclination from said average luminance ratio, and (i3) obtaining said average inclination of an observed part different from said observed part and reconstructing a curved surface of said subject through setting an average curved surface obtained on the basis of these average inclinations as the curved surface of said subject.

5. A method for reconstructing a curved surface of a subject as defined in claim 2, wherein; said method including the steps of:

setting in said step (b-1) one by one said reference images for all of said gradational images detected in said step (a), performing said steps (b-1) to (b-5) to the respective reference images, obtaining preliminary curved surfaces of said subject on the basis of the respective pairs of the first and second luminance ratios obtained in relation to said reference images, and obtaining a weighted average curved surface of these preliminary curved surfaces as the curved surface of said subject.

6. An apparatus for reconstructing a curved surface of a subject, comprising an image detecting part for detecting plural gradational images by photographing a subject from at least two different positions; and a curved surface reconstructing part for computing a luminance ratio of pixels corresponding to each other in the detected gradational images different from each other and reconstructing a curved surface of said subject through computing a surface inclination of said subject on the basis of this luminance ratio, said curved surface reconstructing part comprising;

a first luminance detecting part for setting one of said plural gradational images as a reference image, setting as the first pixel one pixel corresponding to an observed part of said subject out of a number of pixels arranged in a matrix forming said reference image, and detecting the first luminance of said first pixel, an origin pixel setting part for setting as the origin pixel one pixel corresponding to said first pixel out of a number of pixels arranged in a matrix forming said one gradational image different from said reference image, a second luminance detecting part for setting as the second pixel a pixel distant by the first offset from said origin pixel and detecting the second luminance of said second pixel, a third luminance detecting part for setting as the third pixel a pixel which is on the straight line drawn through said origin and said second pixel and is at the opposite side to said second pixel in relation to said origin pixel and is distant by the second offset from said origin pixel, and detecting the third luminance of the third pixel, a first luminance ratio computing part for obtaining the first luminance ratio of said first luminance and said second luminance, a second luminance ratio computing part for obtaining the second luminance ratio of said first luminance and said third luminance, and a depth detecting part for reconstructing a curved surface of said subject on the basis of said first and said second luminance ratio.

7. An apparatus for reconstructing a curved surface of a subject as defined in claim 6, wherein said image detecting part comprises;

a twin-lens stereoscopic detector, a gradational image storing part for storing a left and a right gradational image detected by said twin-lens stereoscopic detector, and a phase-different image storing part for storing a left and right images corresponding information containing relation between the respective pixels corresponding to the same part of said subject in the stored left and right gradational images.

8. An apparatus for reconstructing a curved surface of a subject as defined in claim 6, wherein said depth detecting part comprises;

a first inclination computing part for computing the first inclination from said first luminance ratio, a second inclination computing part for computing the second inclination from said second luminance ratio, a first depth computing part for computing the first depth on the basis of said first inclination, a second depth computing part for computing the second depth on the basis of said second inclination, and an average depth computing part for obtaining an average of said first and said second depth and reconstructing a curved surface of said subject on the basis of this average depth.

9. An apparatus for reconstructing a curved surface of a subject as defined in claim 6, wherein said depth detecting part comprises;

an average luminance ratio computing part for computing an average luminance ratio of said first and said second luminance ratio, an average inclination computing part for computing an average inclination from said average luminance ratio, and a third depth computing part for computing an average depth on the basis of said average inclination and reconstructing a curved surface of said subject on the basis of this average depth.

10. An apparatus for reconstructing a curved surface of a subject as defined in claim 6, wherein the apparatus comprises;

plural stages of said curved surface reconstructing parts for each of which one of said gradational images different from each other is set as a reference image and a depth integrating part for obtaining a depth of said subject by integrating preliminary depths outputted by these curved surface reconstructing parts.

11. An apparatus for reconstructing a curved surface of a subject as defined in claim 10, wherein;

said integration is performed by means of a weighted average process.

* * * * *